United States Patent
Prasad et al.

(10) Patent No.: US 11,607,967 B2
(45) Date of Patent: Mar. 21, 2023

(54) VEHICLE ELECTRICAL SYSTEM HAVING A POWER INVERTER AND AN ELECTRIC MOTOR FOR STEPPING UP VOLTAGE

(71) Applicant: GM Global Technology Operations LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 25 days.

(21) Appl. No.: 17/208,152

(22) Filed: Mar. 22, 2021

(65) Prior Publication Data
US 2022/0297557 A1  Sep. 22, 2022

(51) Int. Cl.
*B60L 53/24* (2019.01)
*H02P 27/08* (2006.01)
*B60L 53/14* (2019.01)
*H02M 7/5387* (2007.01)

(52) U.S. Cl.
CPC ............ *B60L 53/24* (2019.02); *B60L 53/14* (2019.02); *H02M 7/53871* (2013.01); *H02P 27/08* (2013.01); *H02P 2201/09* (2013.01)

(58) Field of Classification Search
CPC .... B60L 53/24; B60L 53/14; H02M 7/53871; H02P 27/08; H02P 2201/09
See application file for complete search history.

(56) References Cited

U.S. PATENT DOCUMENTS

| | | |
|---|---|---|
| 4,588,933 A | 5/1986 | Sun |
| 6,909,201 B2 | 6/2005 | Murty et al. |
| 7,919,949 B2 | 4/2011 | Namuduri et al. |
| 8,432,126 B2 | 4/2013 | Hasan et al. |
| 8,606,447 B2 | 12/2013 | Namuduri et al. |
| 9,118,210 B2 | 8/2015 | Namuduri et al. |
| 9,153,974 B2 | 10/2015 | Reynolds et al. |
| 9,387,766 B2 | 7/2016 | Hao et al. |
| 9,452,672 B2 | 9/2016 | Namuduri et al. |
| 9,573,454 B2 | 2/2017 | Holmes et al. |
| 9,621,099 B1 | 4/2017 | Namuduri et al. |
| 9,657,705 B2 | 5/2017 | Holmes et al. |
| 9,868,410 B2 | 1/2018 | Namuduri et al. |
| 9,882,521 B2 | 1/2018 | Namuduri et al. |
| 9,973,028 B2 | 5/2018 | Namuduri et al. |

(Continued)

FOREIGN PATENT DOCUMENTS

CN    111347893 A    6/2020

*Primary Examiner* — Carlos Amaya
(74) *Attorney, Agent, or Firm* — Vivacqua Crane, PLLC (57) ABSTRACT

An example of a vehicle electrical system includes a rechargeable energy storage system (RESS) having a first voltage and a power inverter selectively connected to the RESS. The system further includes an electric motor having a plurality of machine windings with each of the machine windings including a polyphase terminal electrically connected to the power inverter. The machine windings further include a neutral terminal separate from the polyphase terminals and configured to electrically connect to an off-board power source having a second voltage that is below the first voltage of the RESS. The power inverter is configured to cycle between first and second operational states, such that the power inverter and the electric motor steps up the first voltage to the second voltage.

20 Claims, 9 Drawing Sheets

(56) References Cited

U.S. PATENT DOCUMENTS

| | | |
|---|---|---|
| 10,189,470 B2 | 1/2019 | Atluri et al. |
| 10,259,448 B2 | 4/2019 | Bucknor et al. |
| 10,369,900 B1 | 8/2019 | Conlon |
| 10,432,130 B2 | 10/2019 | Namuduri et al. |
| 10,605,217 B2 | 3/2020 | Namuduri et al. |
| 10,917,030 B1 | 2/2021 | Hao et al. |
| 2008/0173017 A1 | 7/2008 | St. James |
| 2009/0184681 A1* | 7/2009 | Kuno ............... B60L 50/53 320/128 |
| 2010/0188071 A1 | 7/2010 | Kajouke |
| 2012/0306424 A1 | 12/2012 | Naik et al. |
| 2014/0239876 A1 | 8/2014 | Hao et al. |
| 2016/0152153 A1 | 6/2016 | Yang et al. |
| 2016/0185225 A1 | 6/2016 | Namuduri |
| 2018/0050686 A1 | 2/2018 | Atluri et al. |
| 2018/0351398 A1* | 12/2018 | Tang ............... B62D 5/046 |
| 2019/0160953 A1 | 5/2019 | Namuduri et al. |
| 2019/0255953 A1* | 8/2019 | Conlon ............ B60L 53/14 |
| 2021/0044135 A1* | 2/2021 | Lee ................. H02J 7/1492 |
| 2022/0297555 A1 | 9/2022 | Prasad et al. |
| 2022/0302835 A1 | 9/2022 | Prasad et al. |
| 2022/0302836 A1 | 9/2022 | Prasad et al. |
| 2022/0302867 A1 | 9/2022 | Prasad et al. |

* cited by examiner

VEHICLE ELECTRICAL SYSTEM HAVING A POWER INVERTER AND AN ELECTRIC MOTOR FOR STEPPING UP VOLTAGE

INTRODUCTION

The present disclosure relates to a vehicle electrical system, and more particularly to a vehicle electrical system having a power inverter and an electric motor for stepping up a voltage of an off-board power source.

Propulsion systems for battery electric vehicles typically include one or more high-voltage polyphase electric machines in the form of a motor generator unit or an electric traction motor. The electric machines deliver power to or draw power from a rechargeable direct current (DC) battery pack. The energized electric machines adjust torques of the various gear sets of the propulsion system to achieve optimal system efficiency. Because the battery pack of modern BEVs can be rated for voltages that are higher than the available voltage of legacy DC charging stations, the vehicles further include a separate DC/DC converter for stepping up a voltage of off-board power sources used to charge the battery pack. However, the DC/DC converter may increase the cost, mass, and volume of the vehicle.

The propulsion systems typically further include a power inverter module having semiconductor switches that are controlled via pulse-width modulation or other switching control signals to convert the battery output voltage to an alternating current (AC) output voltage. The AC output voltage from the power inverter module is transmitted to the individual machine windings of the electric machine. The energized electric machine provides torque or other driving force for the propulsion system of the vehicle.

Thus, while existing vehicle electrical systems include DC/DC converters to achieve their intended purpose, there is a need for a new and improved vehicle electrical system that addresses these issues.

SUMMARY

According to several aspects of the present disclosure, a vehicle electrical system includes a rechargeable energy storage system (RESS) having a first voltage and a power inverter selectively connected to the RESS. The system further includes an electric motor having a plurality of machine windings, with each of the machine windings including a polyphase terminal electrically connected to the power inverter. The machine windings further include a neutral terminal separate from the polyphase terminals. The neutral terminal is adapted to electrically connect to an off-board power source, which generates a second voltage that is below the first voltage of the RESS. The power inverter is configured to cycle between a first operational state where the power inverter electrically disconnects the RESS from the machine windings and a second operational state where the power inverter electrically connects the RESS to the machine windings, such that the power inverter steps up the second voltage of the off-board power source to the first voltage of the RESS.

In one aspect, the system further includes one or more charger switches disposed between the neutral terminal of the electric motor and the off-board power source. The charger switch is configured to transition between a closed state to allow current to flow from the off-board power source to the electric motor and an open state to prevent current from flowing to the electric motor.

In another aspect, the machine windings are a plurality of inductors.

In another aspect, the power inverter includes a set of semiconductor inverter switches that are configured to convert direct current (DC) power to alternating current (AC) power.

In another aspect, each of the semiconductor inverter switches is a voltage-controlled switching device.

In another aspect, the voltage-controlled switching device is at least one of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), a wideband-gap (WBG), or an ultra-wideband-gap (UWBG) semiconductor power switching device.

In another aspect, the power inverter includes a plurality of phase legs, with each of the phase legs having a pair of the semiconductor inverter switches, and each of the phase legs is connected to a corresponding one of the inductors.

In another aspect, the phase legs include first, second, and third phase legs, and at least one of the semiconductor inverter switches of the first, second, and third phase legs is pulse-width modulated to allow current to flow through an associated one of the first, second, and third phase legs.

In another aspect, the system further includes a ripple inductor connected in series between neutral terminal of the electric motor and the off-board power source, and the ripple inductor is configured to mitigate current ripple and torque disturbance.

In another aspect, the charger switch is a contactor.

According to several aspects of the present disclosure, a vehicle electrical system includes a rechargeable energy storage system (RESS) having a first voltage and a power inverter selectively connected to the RESS. The system further includes an electric motor having a plurality of machine windings, with each of the machine windings including a polyphase terminal electrically connected to the power inverter. The machine windings further include a neutral terminal separate from the polyphase terminals and adapted to electrically connect to an off-board power source, which generates a second voltage that is below the first voltage of the RESS. The system further includes a controller electrically connected to the power inverter, and the controller is configured to transmit a plurality of control signals to the power inverter. The power inverter may be disposed in the first operational state where the power inverter electrically disconnects the RESS from the machine windings, and the power inverter may be disposed in the second operational state where the power inverter electrically connects the RESS to the machine windings, in response to the power inverter receiving the control signals from the controller. The power inverter is configured to cycle between first and second operational states, such that the power inverter steps up the second voltage of the off-board power source to the first voltage of the RESS.

In one aspect, the system further includes one or more charger switches disposed between the neutral terminal of the electric motor and the off-board power source. The charger switch is configured to transition between a closed state to allow current to flow from the off-board power source to the electric motor and an open state to prevent current from flowing to the electric motor.

In another aspect, the machine windings are a plurality of inductors.

In another aspect, the power inverter includes a set of semiconductor inverter switches that are configured to convert direct current (DC) power to alternating current (AC) power.

In another aspect, each of the semiconductor inverter switches is a voltage-controlled switching device.

In another aspect, the voltage-controlled switching device is at least one of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), a wideband-gap (WBG) semiconductor power switching device, or an ultra-wideband-gap (UWBG) semiconductor power switching device.

In another aspect, the off-board power source is at least one of a DC fast-charging station during a V2X charging operation and an electrical system of a third-party motor vehicle that is separate from the motor vehicle during a V2V charging operation.

In another aspect, the controller receives one or more software updates via over-the-air programming associated with the control signals generated by the controller.

According to several aspects of the present disclosure, a method of operating a vehicle electrical system is provided. The system includes a rechargeable energy storage system (RESS) having a first voltage, a power inverter, and an electric motor having a plurality of machine windings. Each of the machine windings includes a polyphase terminal and a neutral terminal separate from the polyphase terminals. The system further includes a controller and a switch for connecting an off-board power source to the neutral terminal of the electric motor, with the off-board power source having an available second voltage that is below the first voltage of the RESS. The method includes the controller generating a plurality of control signals, in response to the controller receiving a command for a boost operation. The method further includes the power inverter cycling between first and second operational states, in response to the power inverter receiving the control signals from the controller. The power inverter in the first operational state electrically disconnects the RESS from the machine windings and the power inverter in the second operational state electrically connects the RESS to the machine windings. The method further includes the power inverter and the electric motor stepping up the second voltage of the off-board power source to the first voltage of the RESS, in response to the power inverter cycling between the first and second operational states.

In one aspect, the method further includes the controller generating first and second control signals, in response to the controller receiving a command for a boost operation. The method further includes the power inverter being disposed in a first operational state, in response to the power inverter receiving the first control signal from the controller. The method further includes the power inverter electrically disconnecting the RESS from the machine windings of the electric motor, in response to the power inverter being disposed in the first operational state. The method further includes the power inverter being disposed in a second operational state, in response to the power inverter receiving the second control signal from the controller. The method further includes the power inverter electrically connecting the RESS to the machine windings of the electric motor, in response to the power inverter being disposed in the second operational state. The method further includes the power inverter and the electric motor stepping up the second voltage of the off-board power source to the first voltage of the RESS, in response to the power inverter electrically disconnecting and connecting the RESS to the machine windings.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a motor vehicle 100 (FIGS. 1A and 1B) having an electrical system 102 (FIGS. 2, 3A, and 3B) for stepping up voltage generated by an off-board power source 122 to charge an onboard rechargeable energy storage system 104 (RESS) that stores a voltage above the voltage of the off-board power source 122. As described in detail below for FIGS. 3A and 3B, the system 102 includes a power inverter 108 with a set of inverter switches 110 and an electric motor 112 with a plurality of machine windings L1-L3 connected to the inverter switches 110. The system 102 further includes a controller 116 and an inverter controller 180 for selectively transitioning one or more of the inverter switches 110 between open and closed states to cause electrical power to be directed from the off-board power source 122 through the machine windings L1-L3 to step up voltage of the off-board power source 122 and charge the RESS 104.

Figure 1A:
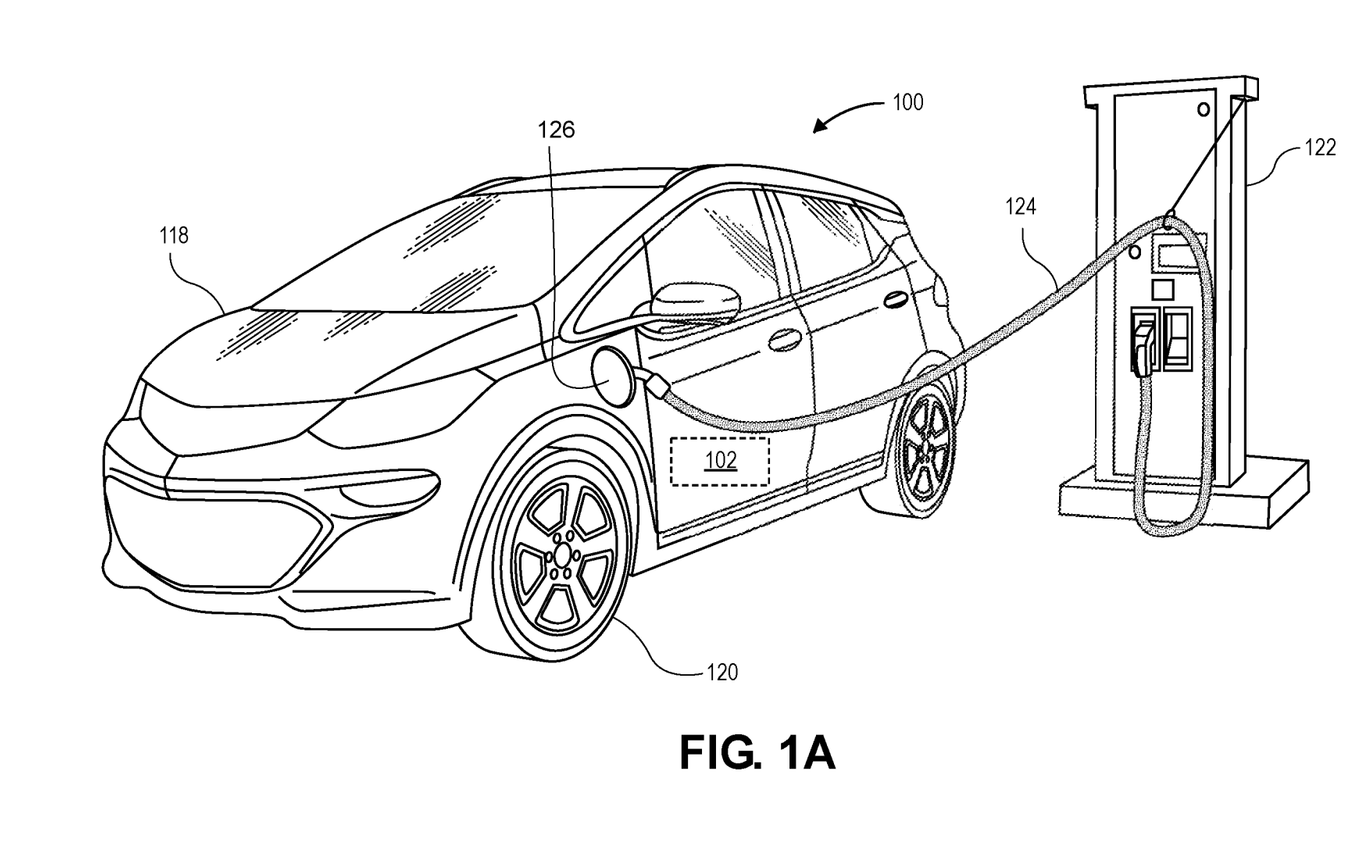
FIG. 1A is a perspective view of one example of a motor vehicle having a vehicle electrical system connected to an off-board power source in the form of a DC fast-charging station.

Referring now to FIG. 1A, one example of the motor vehicle 100 is a plug-in electric vehicle having a body 118, a plurality of drive wheels 120, and the system 102. The system 102 can include a DC charging circuit 128 (FIG. 2) that incorporates propulsion/traction drive components of the vehicle 100. The ordinary functions of those components may include powering the electric motor 112, e.g., a traction motor, to generate and deliver motor torque or other driving force to the drive wheels 120 for propulsion of the vehicle 100, or for performing other useful work aboard the vehicle 100.

Figure 1B:
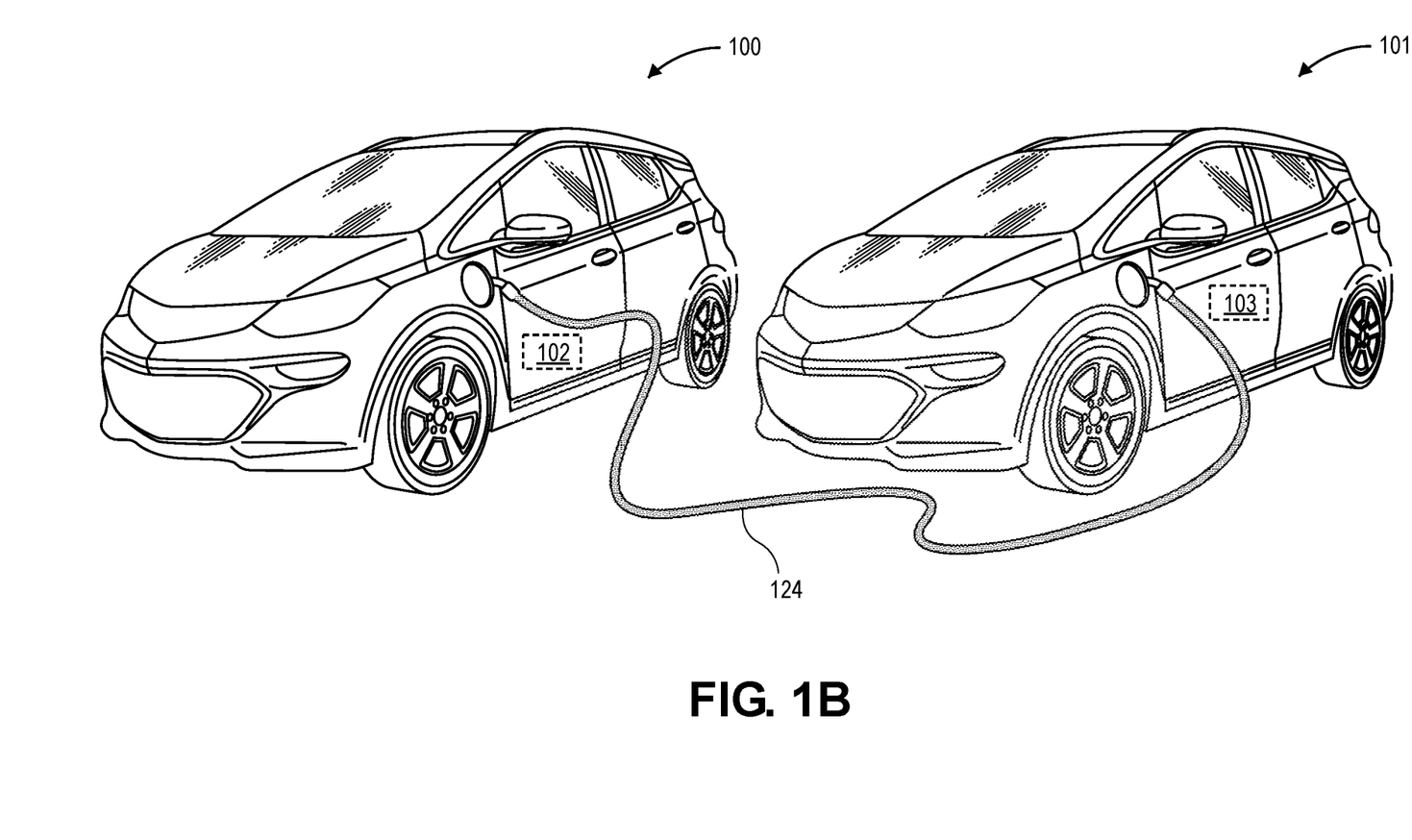
FIG. 1B is a perspective view of the motor vehicle of FIG. 1A, illustrating the vehicle electrical system connected to an off-board power source in the form of an electrical system of a third-party motor vehicle during a V2V charging operation.

The system 102 can be used as part of any mobile system with the off-board power source 122 being a DC fast-charging station disposed in a fixed location and configured to charge the RESS 104. A charging cable 124 and a charging port 126 electrically connect the system 102 to the DC fast-charging station 122 during a DC fast-charging operation. The body 118 may define or include the charging port 126 at a user-accessible location. One non-limiting example of the charging cable 124 can be an SAE J1772 charge connector, CHAdeMO, or another suitable regional or national standard charging plug or connector. The present teachings are independent of the particular charging standard that is ultimately employed in a V2X charging operation involving the DC fast-charging station 122, and thus the examples described herein are merely illustrative. In another non-limiting example as shown in FIG. 1B, the off-board power source can be an electrical system 103 of a third-party motor vehicle 101 during a V2V charging operation. The electrical system may be used as part of a stationary or mobile power plant, a robot, or a platform. The electrical system may be used as part of an aircraft, a marine vessel, and a rail vehicle. For illustrative consistency, an application of the system as an integral part of the motor vehicle 100 will be described hereinafter without limiting the present disclosure to such an implementation.

Figure 3A:
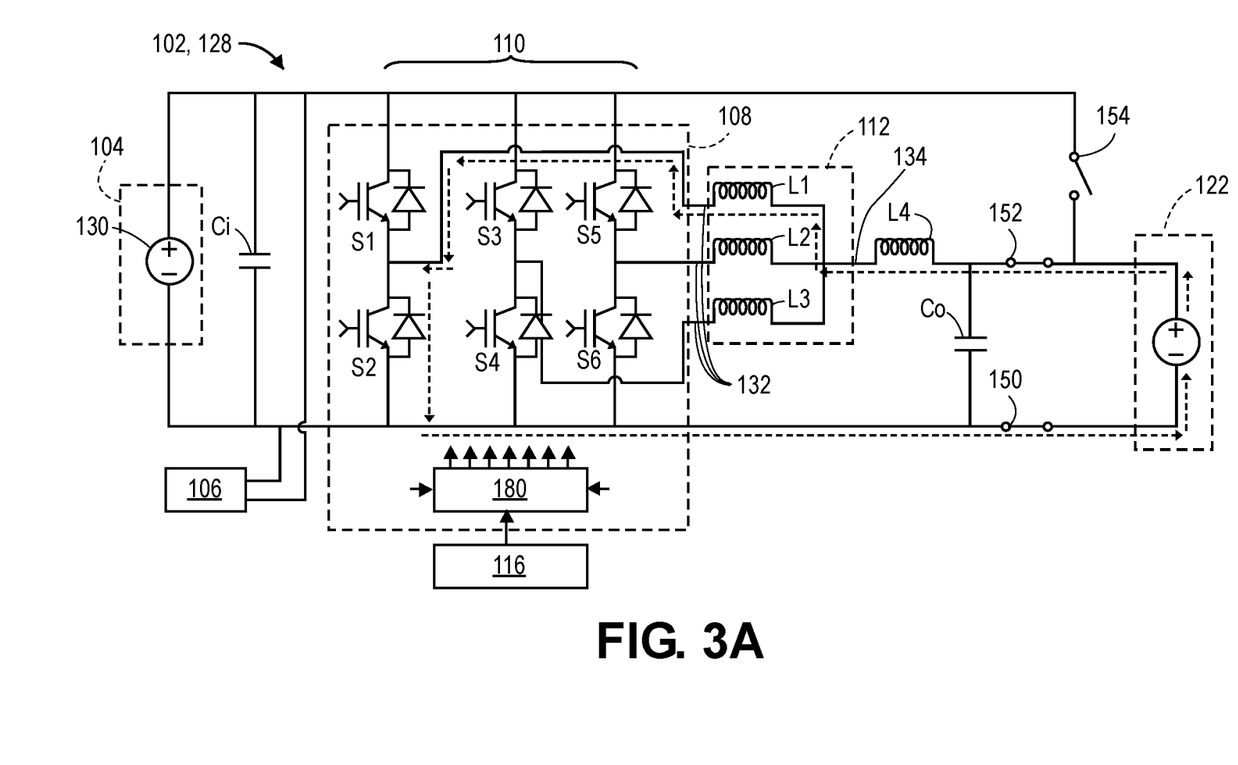
FIG. 3A is a circuit schematic of the system of FIG. 2, illustrating the power inverter disposed in a first operational state where the power inverter electrically disconnects the RESS from the electric motor that is in turn electrically connected to the off-board power source.
Figure 3B:
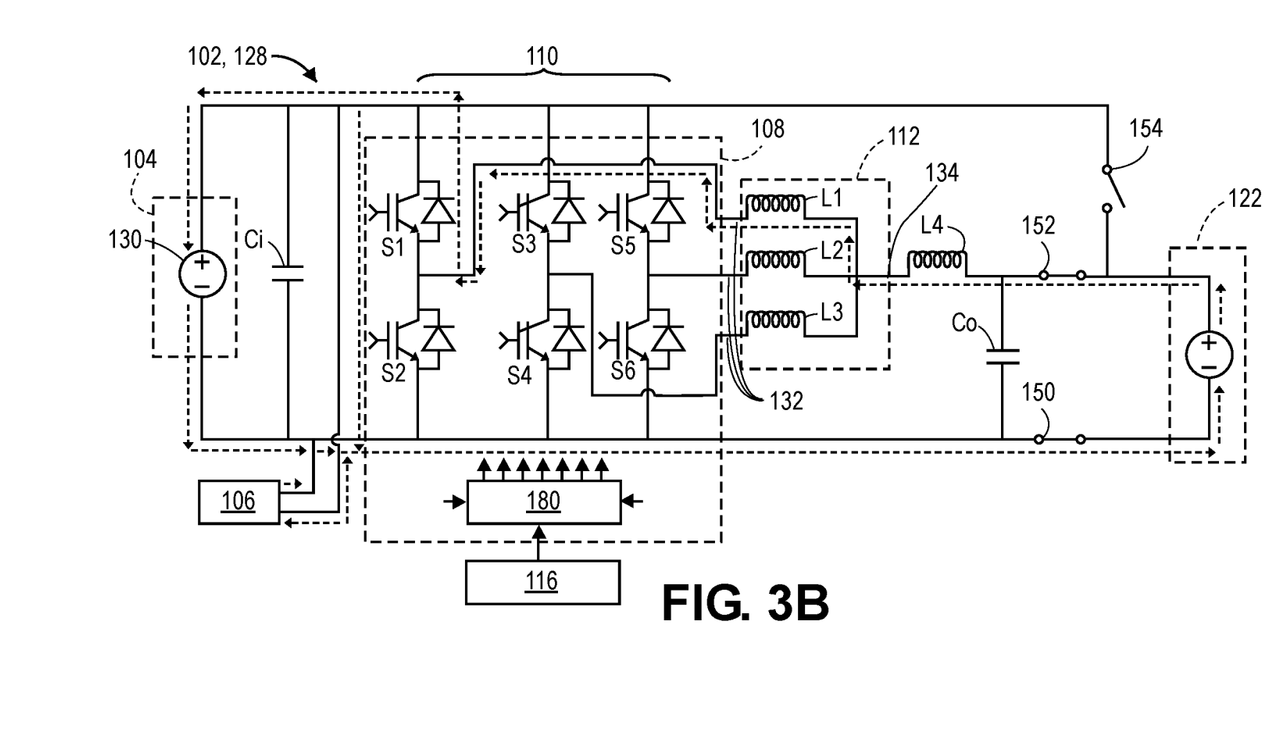
FIG. 3B is a circuit schematic of the system of FIG. 2, illustrating the power inverter disposed in a second operational state where the power inverter electrically connects the RESS to the electric motor.

Referring now to FIGS. 3A and 3B, the system 102 includes the RESS 104, which can be selectively recharged using the off-board power source 122. The RESS 104 is rated for storing a first voltage, and the off-board power source 122 has a second voltage that is below the first voltage of the RESS 104. The RESS 104 may include one or more high-voltage, independently-rechargeable battery packs 130. Non-limiting examples of the RESS include a multi-cell lithium ion battery pack, a zinc-air battery pack, a nickel-metal hydride battery pack, and a lead acid direct current battery pack. The RESS 104 is adapted for storing high-voltage electrical energy used for propelling the vehicle. The RESS 104 may be a deep-cycle, high-ampere capacity battery system rated for a first voltage. The first voltage can be in the range between four hundred (400) to approximately eight hundred (800) volts direct current (VDC). However, it is contemplated that the RESS 104 can be rated for a first voltage that is above 800 VDC depending on a desired vehicle range, gross vehicle weight, and power ratings of the various loads drawing electrical power from the RESS 104. As shown in FIGS. 3A, 3B, 5A, and 5B, a DC link capacitor Ci can be connected across positive and negative terminals. The RESS 104 may be electrically connected to a high-voltage DC bus bar 136 and the power inverter 108 for governing the transmission of electrical energy to and from the electric motor 112.

The system 102 further includes the power inverter 108 that can selectively connect the RESS 104 to the electric motor 112. The power inverter 108 can be a DC-to-AC and AC-to-DC power inverter, which may be part of a transmission power inverter module (TPIM). The power inverter 108 includes the set 110 of semiconductor inverter switches S1-S6 ("inverter switches") that cooperatively convert direct current (DC) power from the RESS 104 to alternating current (AC) power for powering the electric motor 112 via high-frequency switching. Each inverter switch S1-S6 may be embodied as a voltage-controlled switching device in the form of insulated gate bipolar transistor (IGBT), a silicon carbide (SiC) metal-oxide semiconductor field effect transistor (MOSFET), a silicon (Si) superjunction MOSFET, a Gallium nitride (GaN), field-effect transistor (FET), a SiC junction-gate field-effect transistor (JFET), other wideband-gap (WBG) or an ultra-wideband-gap (UWBG) semiconductor power switching device, or other suitable switch having a corresponding gate to which a gate signal is applied to change the on/off state of a given switch.

The power inverter 108 includes at least one pair of semiconductor switches for each phase of the three-phase traction motor 112. Each pair of switches, e.g., switches S1 and S2 (Phase A), switches S3 and S4 (Phase B), and switches S5 and S6 (Phase C), may referred to as phase legs of the power inverter 108. For example, the power inverter 108 may include at least three (3) phase legs. Each phase leg of the power inverter 108 is connected to a corresponding machine phase terminal, e.g., one of the machine windings L1-L3. In this example, the inverter switches S1-S6 are contactors that are adapted to close under electrical load so as to ensure the instantaneous or near instantaneous delivery of electrical power to the vehicle's propulsion system and to drive any number of in-vehicle accessories. The power inverter 108 may incorporate multiple phases and respective motor control modules operable to receive motor control commands and control inverter states therefrom for providing motor drive or regenerative functionality.

The system 102 further includes the electric motor 112 having machine windings L1-L3, with each of the machine windings L1-L3 having a polyphase terminal 132 (FIG. 2) electrically connected to the power inverter 108. The machine windings L1-L3 further have a neutral terminal 134 (FIG. 4) separate from the polyphase terminals 132 and configured to be electrically connected to the off-board power source 122. In this example, the electric motor is a three-phase traction motor 112 with three machine windings in the form of inductors L1-L3 having three associated phase terminals 132 and a common neutral terminal 134. Each inductor L1-L3, is electrically connected to a corresponding one of the three phase terminals of the power inverter 108, and the three phase terminals are electrically connected to an associated one of the first, second, and third phase legs of the power inverter. Inductor L4 can be electrically connected to the neutral terminal of the motor 112 and positioned in series with one or more of the machine windings L1-L3 to reduce, e.g., mitigate, current ripple and torque disturbance. During propulsion of the motor vehicle 100, the machine windings L1-L3 can provide three-phase current to create a rotating magnetic field to rotate a rotor of the traction motor 112. It is understood that the traction motor 112 may include more than three machine windings depending on a motor configuration.

The off-board power source 122 is rated for the second voltage, which is used for charging the RESS 104 and is below the first voltage of the RESS 104. In this example, the off-board power source 122 is a DC fast-charging station 122 that is electrically connected to the neutral terminal 134 of the electric motor 112. The DC fast-charging station 122 may be represented as Vload 138, with a filter capacitor Co electrically connected across Vload 138. As one non-limiting example, the DC fast-charging station 122 is rated for delivering approximately four hundred (400) VDC, and the RESS 104 may be adapted to store approximately eight hundred (800) VDC. In other examples, the DC fast-charging station 122 may be rated for delivering any voltage below the first voltage of the RESS.

The system 102 further includes a charger switch 152 disposed between a positive terminal of the DC fast-charging station 122 and the neutral terminal 134 of the electric motor 112, and the system 102 further includes a charger switch 150 disposed between a negative terminal of the DC fast-charging station 122 and the power inverter 108 for controlling a boost DC-DC operation and delivering electrical power from DC fast-charging station 122 to the machine windings L1-L3 of the electric motor 112. The charger switches 150, 152, are configured to transition between a closed state to allow current to flow from the DC fast-charging station 122 to the machine windings L1-L3 and an open state for preventing current from flowing to the machine windings L1-L3. The system 102 further includes a charger switch 154 disposed between the positive terminal of the DC fast-charging system 122 and the RESS 104 to allow current to flow directly from a DC fast-charging system to the RESS 104 when, for example, the voltage of the DC fast-charging system is equal to the voltage of the RESS. The charger switches 150, 154, are configured to transition between a closed state to allow current to flow from the DC fast-charging station 122 directly to the RESS 104 and an open state to prevent current from flowing to the RESS 104.

The electrical system further includes a controller 116 and an inverter controller 180 that are electrically connected to the power inverter 108 inverter switches S1-S6 and the charger switches 150, 152, 154. The controller 116 and/or the inverter controller 180 are configured to transmit a plurality of control signals to the inverter switches S1-S6 and the charger switches 150, 152, 154 to allow current to flow from the DC fast-charging station 122 through the machine windings L1-L3 to the RESS 104 during the first operational state (FIG. 3A) and to prevent current to flow from the DC fast-charging station 122 through the machine windings L1-L3 to the RESS 104 during the second operational state (FIG. 3B).

Each of the controller 116 and/or the inverter controller 180 include one or more processors and sufficient memory for storing computer-readable instructions. The memory includes tangible, non-transitory memory, e.g., read only memory, whether optical, magnetic, flash, or otherwise. The controller 116 and/or the inverter controller 180 also include sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 116 and/or the inverter controller 180 can receive charging request signals from one or more electronic control units (ECUs) of the vehicle 100. For example, an ECU associated with the vehicle to charging station or vehicle to vehicle communication system may provide a signal indicating that the RESS 104 needs to be charged from a source that has lower voltage than the voltage of the RESS 104, and the controller 116 can initiate the boost DC-DC operation as discussed below. If the DC fast-charging station 122 is capable of directly supplying the required charging voltage for the RESS 104, the controller 116 and/or the inverter controller 180 transmit control signals to the switches 150, 152, and 154, and the switches 150, 154 are closed and switch 152 is open in response to the control signals, e.g., when the boost mode operation not used.

In one example, the inverter controller 180 can receive signals from the controller 116 and/or from sensors within the traction motor 112. For example, the traction motor 112 can include phase current sensors and/or rotor position sensors and provide signals indicative of a phase current and/or a position of the rotor, respectively. The inverter controller 180 can control the semiconductor switches S1-S6 by supplying a signal to one or more gates to cause the semiconductor switches S1-S6 to transition between an open state and a closed state, as discussed in greater detail below.

In some implementations, software for the controller 116 and/or the inverter controller 180 may be updated based via over-the-air programming. For example, one or more software updates can be transmitted to the controller 116 via one or more suitable communication networks from a data source, such as an original equipment manufacturer (OEM). The over-the-air updates can provide desired parameters to adjust charging power by adjusting the inverter control signals, e.g., current command, frequency, duty cycle, phase shift, etc., for one or more switches S1-S6 according to a charging power level via the inverter controller 180.

The power inverter 108 is configured to cycle between a first operational state (FIG. 3A) where the power inverter 108 electrically disconnects the RESS 104 from each one of the machine windings L1-L3 of the electric motor 112 and a second operational state (FIG. 3B) where the power inverter 108 electrically connects the RESS 104 to one or more of the machine windings L1-L3, such that the power inverter 108 steps up the second voltage of the DC fast-charging station 122 for charging the RESS 104. The associated machine windings L1-L3 perform a boost conversion, in response to the inverter switches S1-S6 and the charger switches 150, 152 receiving the control signals from the controller 116 and/or the inverter controller 108.

As shown in FIG. 3A, the power inverter 108 is disposed in the first operational state where the power inverter electrically disconnects the RESS 104 from the electric motor 112 to prevent current from flowing from the DC fast-charging station 122 to the RESS 104 and increase current through the one or more of the inductors. More specifically, the charger switches 150, 152 are first disposed in the closed state, and then each of the inverter switches S1, S3, and S5 are disposed in the open state, and one or more of the inverter switches S2, S4, and S6 are disposed in the closed state. In the illustrated example, current flows through the inductors L1, L4, in response to and the inverter switch S2 being disposed in the closed state and the inverter switches S1 and S3-S6 being disposed in the open state. Similarly, current flows through the inductors L2, L4, in response to the charger switches 150, 152 and the inverter switch S6 being disposed in the closed state and the inverter switches S1-S5 being disposed in the open state. Current flows through the inductors L3, L4, in response to the charger switches 150, 152 and the inverter switch S4 being disposed in the closed state and the inverter switches S1-S3, S5, and S6 being disposed in the open state. Any suitable combination of inverter switches S2, S4, and S6 can be subjected to a pulse-width-modulation signal from the controller 116 to transition the associated inverter switches between open and closed states, while the inverter switches S1, S3, S5 remain in the open state. It is contemplated that the switching of the individual phase legs can be modulated in synchronism or interleaved. In this non-limiting example, the duty cycle may be fifty percent (50%). The duty cycle depends on the commanded charging power through the controller.

Referring to FIG. 3B, the power inverter 108 is disposed in the second operational state where the power inverter 108 electrically connects the RESS 104 to the electric motor 112 to allow current to flow from the DC fast-charging station 122 through one or more of the inductors L1-L3 of the electric machine 112 to the RESS 104. More specifically, the charger switches 150, 152 are disposed in the closed state are first closed, and then one or more of the inverter switches S1, S3, and S5 are disposed in a closed state, the inverter switches S2, S4, and S6 are disposed in an open state. In the illustrated example, current flows from the DC fast-charging station 122 through the inductors L1, L4, in response to the charger switches 150, 152 and the inverter switch S1 being disposed in the closed state and the inverter switches S2-S6 being disposed in the open state. Similarly, current can flow from the DC fast-charging station 122 through the inductors L2, L4, in response to the charger switches 150, 152 and the inverter switch S5 being disposed in the closed state and the inverter switches S1-S4 and S6 being disposed in the open state. Current can flow from the DC fast-charging station 122 through the inductors L3, L4, in response to the charger switches 150, 152 and the inverter switch S3 being disposed in the closed state and the inverter switches S1, S2, and S4-S6 being disposed in the open state. Any suitable combination of inverter switches S1, S3, and S5 can be subjected to a pulse-width-modulation signal from the controller 116 to transition the associated inverter switches between open and closed states, while the inverter switches S2, S4, S6 remain in the open state. It is contemplated that the switching of the individual phase legs can be modulated in synchronism or interleaved. In this non-limiting example, the duty cycle may be fifty percent (50%). The duty cycle depends on the commanded charging power through the controller.

When utilized, filter inductor L4 can be positioned in series with the machine windings L1-L3 to reduce, e.g., mitigate, current ripple as well as machine torque ripple. It is understood that the filter inductor may be optional in some implementations.

Figure 2:
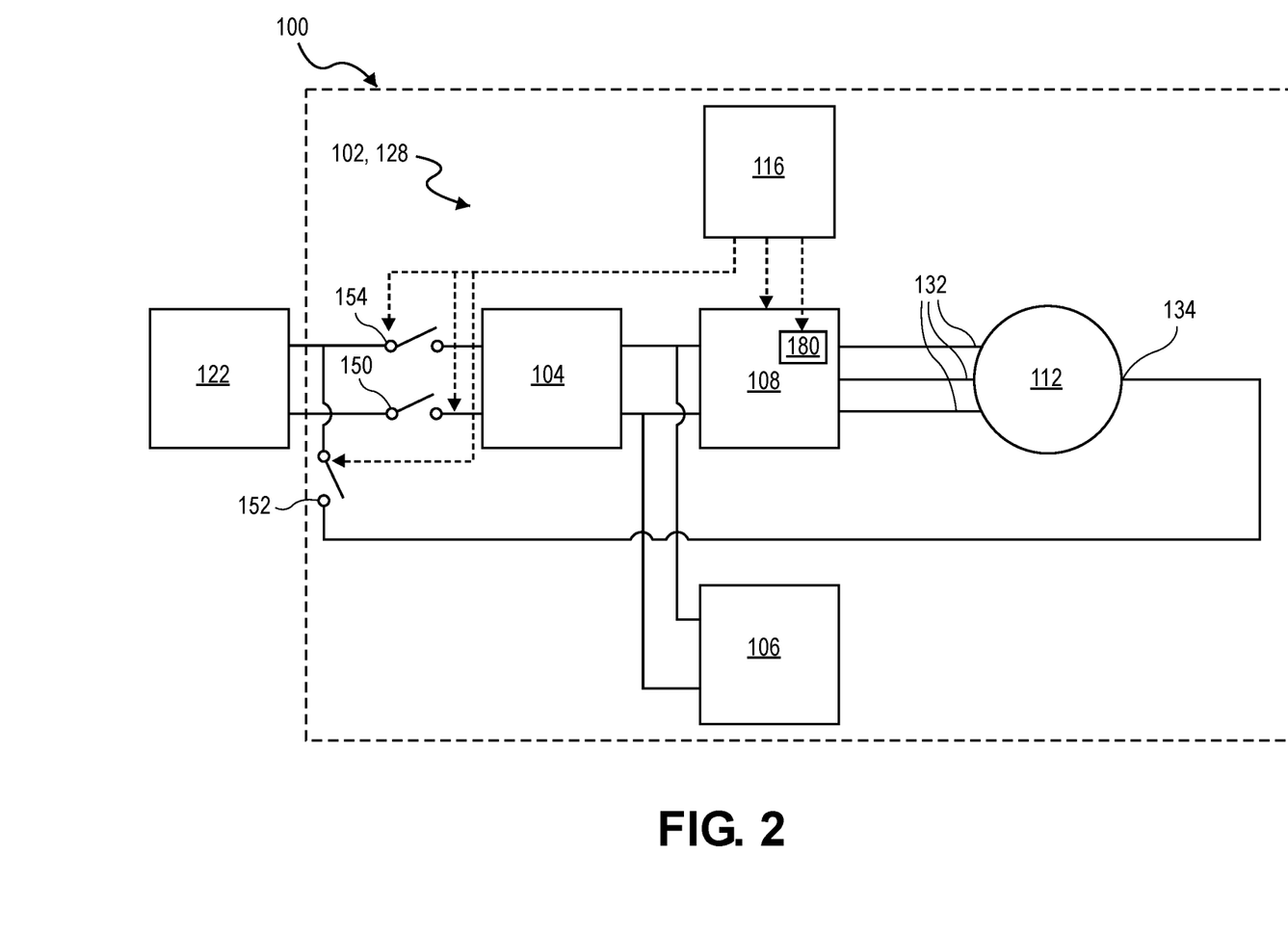
FIG. 2 is a block diagram of the system of FIG. 1A, illustrating the system having a power inverter and an electric motor for stepping up an available voltage of the off-board power source for charging a rechargeable electronic storage system (RESS) that is rated for storing a voltage above the available voltage of the off-board power source.
Figure 4:
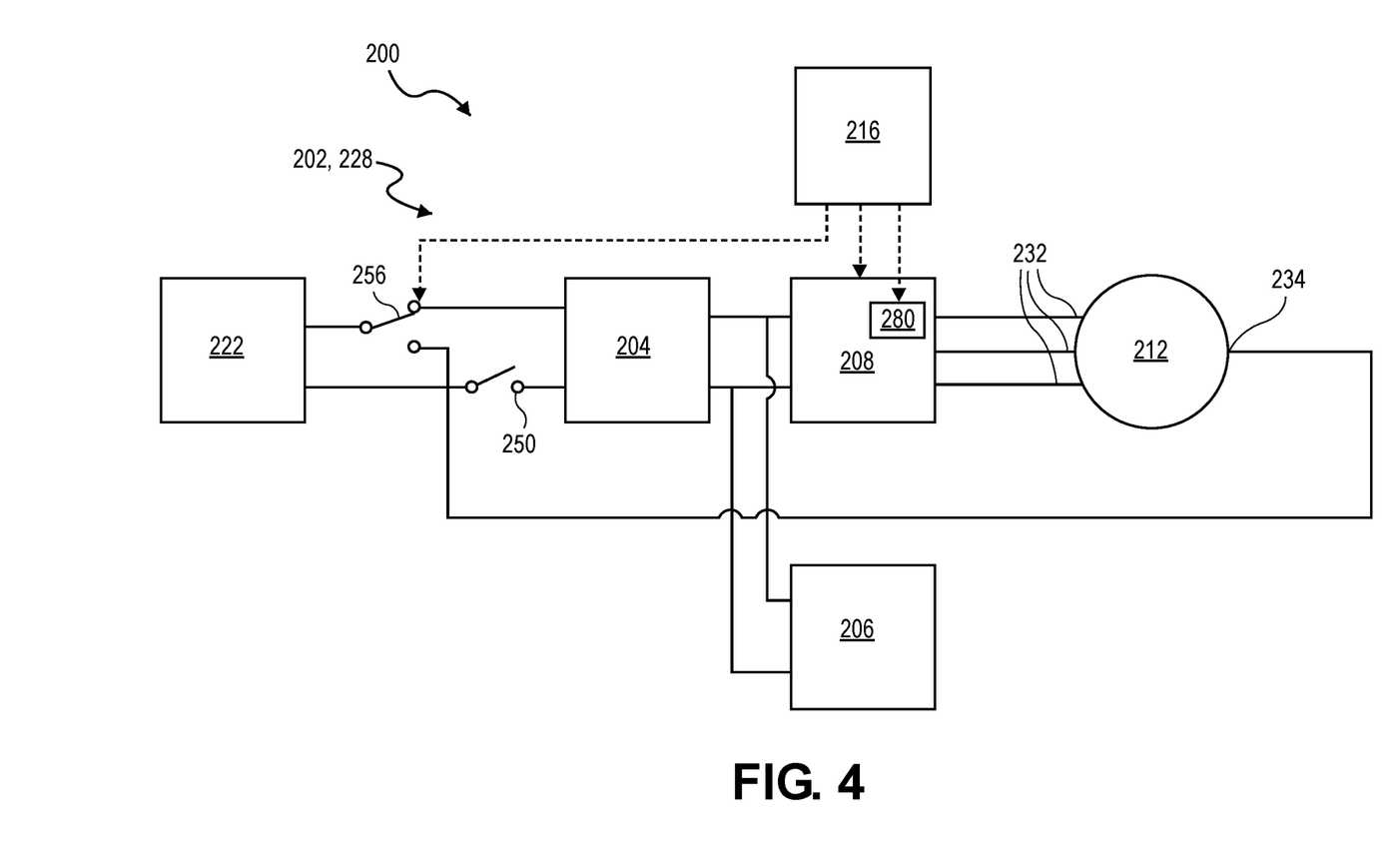
FIG. 4 is a block diagram of another example of the system of FIG. 1A, illustrating the system having a Single Pole Double Throw switch for connecting the off-board power source to the electric motor or the RESS.
Figure 5A:
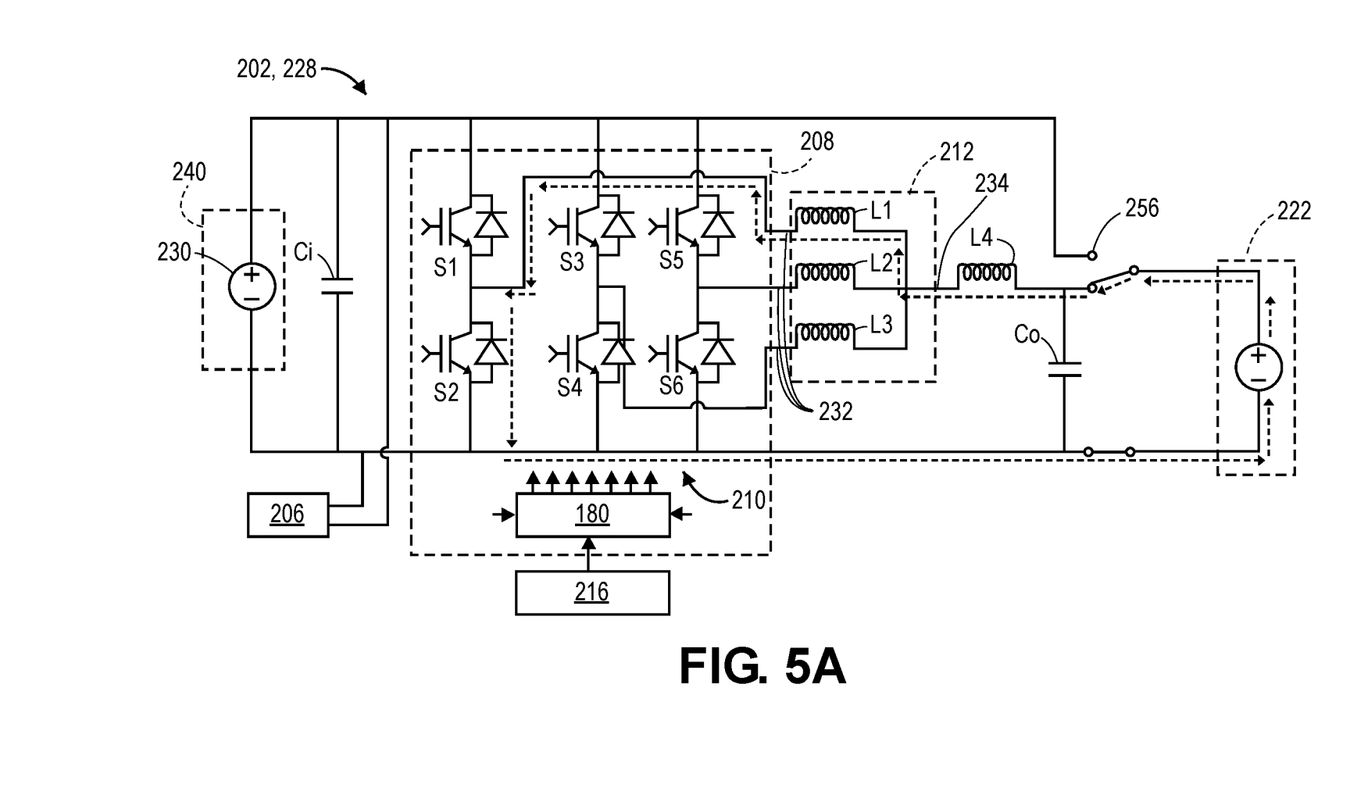
FIG. 5A is a circuit schematic of the system of FIG. 4, illustrating the power inverter disposed in a first operational state where the power inverter electrically disconnects the RESS from the electric motor that is in turn electrically connected to the off-board power source.
Figure 5B:
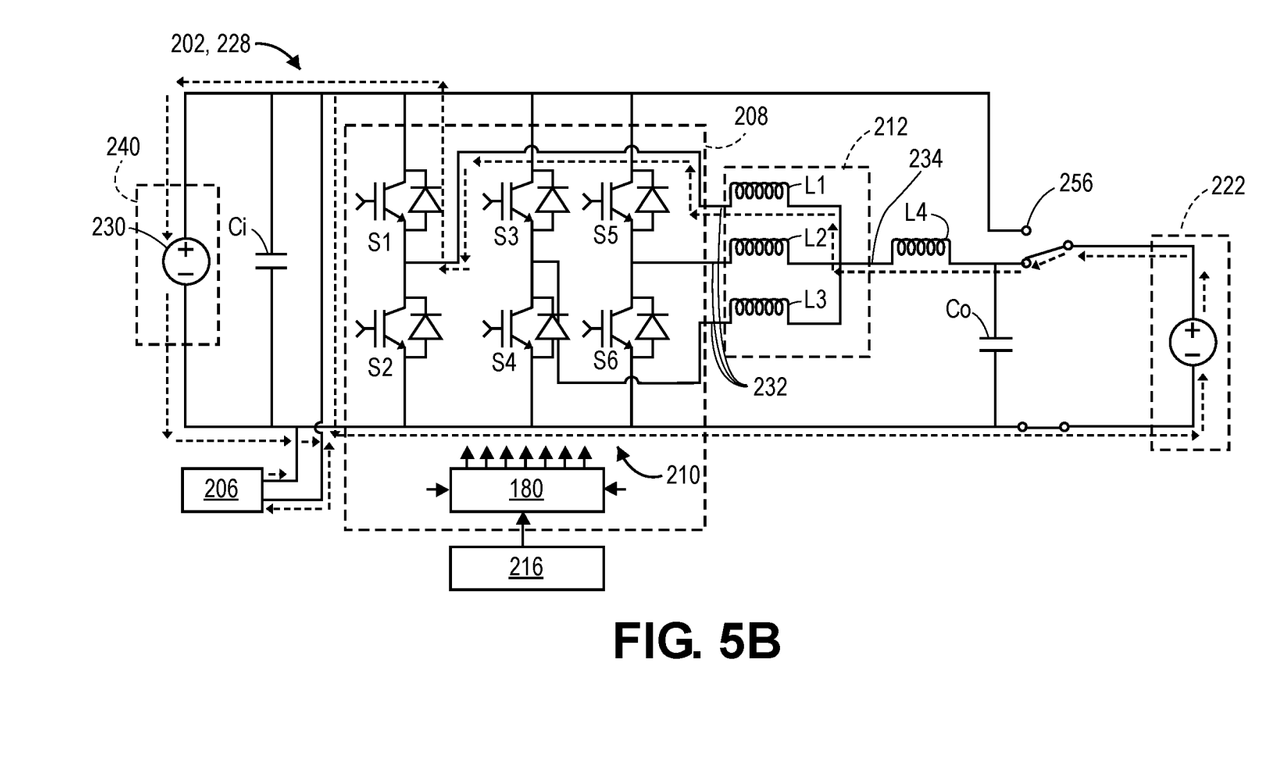
FIG. 5B is a circuit schematic of the system of FIG. 4, illustrating the power inverter disposed in a second operational state where the power inverter electrically connects the RESS to the electric motor.

Referring to FIGS. 4, 5A, and 5B, another example of a vehicle electrical system 202 is similar to the system 102 of FIGS. 2, 3A, and 3B and has the same components identified by the same reference numbers increased by 100. While the electrical system of FIGS. 2, 3A, and 3B includes the charger switches 152, 154, the electrical system 202 has a Single Pole Double Throw switch 256 electrically connecting the off-board power source 222 to the electric motor 212 or the RESS 204.

Figure 6:
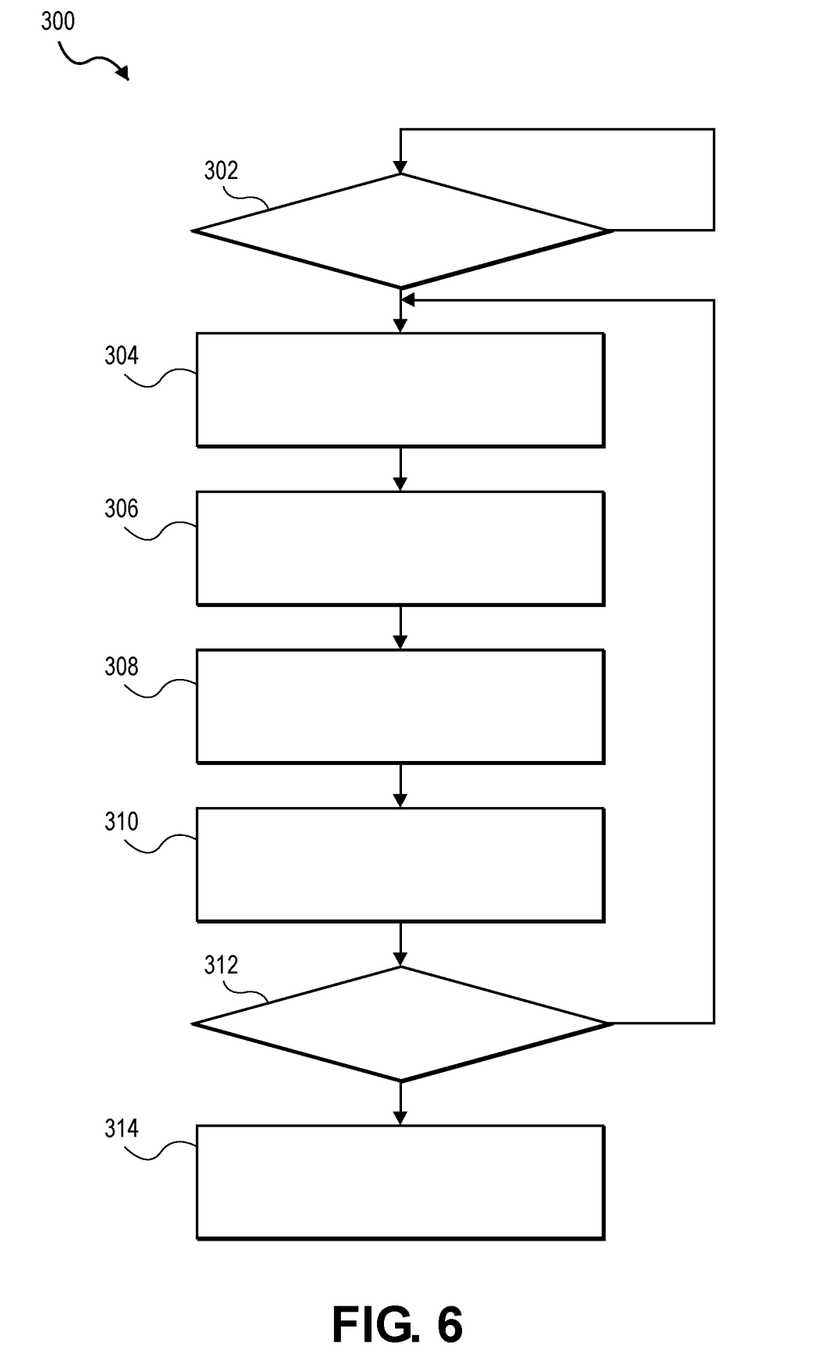
FIG. 6 is a flow chart illustrating one example of a method for operating the system of FIG. 2.

Referring to FIG. 6, a flow chart of an exemplary method 300 for operating the system 102 of FIG. 2 to step up the voltage of the off-board power source 122 for charging the RESS 104. Blocks of the method 300 can be executed by the controller 116 and/or inverter controller 180. The method 300 begins at block 302 with the controller 116 determining whether the controller 116 has received a command for a boost operation associated with charging the RESS 104. For example, one or more ECUs may send a charge signal to the controller 116 indicating that the RESS 104 requires charging from the off-board power source 122 having an available voltage below the voltage of the RESS 104. If the controller 116 determines that the controller 116 has not received the charge signal, the method 300 repeats block 302. If the controller 116 determines that the controller 116 has received the charge signal, the method proceeds to block 304.

At block 304, the controller 116 generates one or more control signals and transmits the control signals to the power inverter 108, e.g., the inverter controller 180 for controlling an associated one of the switches S1-S6 of the power inverter 108 and/or the charger switches 150, 152, 154. The control signals may be voltage signals that cause the inverter switches S1-S6 and/or the charger switches 150, 152, 154 to transition to a desired operating state, e.g., the open state or the closed state, for electrically disconnecting or connecting the RESS 104 with the electric motor 112.

At block 306, the power inverter 108 cycles between the first and second operational states to increase current through one or more of the inductors L1-L3, in response to the power inverter 108 receiving the control signals from the controller 116. More specifically, the power inverter 108 is disposed in the first operational state for transitioning each of the inverter switches S1-S3 to the open state and transitioning one or more of the inverter switches S4-S6 to the closed state, in response to the associated inverter switches receiving the first control signal from the controller 116. The inverter switches S2, S4, and/or S6 can be subjected to the second control signal in the form of a pulse-width-modulation signal from the controller 116 to transition the inverter switches S2, S4, and S6 between the open and closed states during the second operational state. The RESS 104 is electrically disconnected from each one of the machine windings L1-L3, and current does not flow from the inductors to the RESS 104, in response to the power inverter 108 being disposed in the first operational state. As discussed above, the inverter 108 and the machine windings L1-L3 function as a boost converter by causing the current to flow from the inverter 108 through the machine windings L1-L3 of the electric motor 112, which increases the voltage from the second voltage, e.g., 400 VDC of the off-board power source 122, to the first voltage, e.g., 800 VDC of the RESS 104. In this example, the charger switch 154 is also in the closed state to provide a connection between the off-board power source 122 and the neutral terminal 134 of the electric motor 112.

The power inverter 108 is disposed in the second operational state for transitioning one or more of the inverter switches S1-S3 to the closed state and transitioning each of the inverter switches S4-S6 to the open state, in response to the associated inverter switches receiving the second control signal from the controller 116. The inverter switches S1, S3, and/or S5 can be subjected to the first control signal in the form of a pulse-width-modulation signal from the controller 116 to transition the inverter switches S1, S3, and S5 between the open and closed states during the first operational state. One or more of the associated inductors L1, L2, or L3 of the machine windings L1-L3 is electrically connected to the RESS 104, and current flows from the inductors to the RESS 104, in response to power inverter 108 being disposed in the second operational state.

At block 308, the power inverter 108 and the electric motor 112 step up voltage from the second voltage of the off-board power source 122 to the first voltage stored by the RESS 104, in response to the power inverter 108 cycling between the first and second operational states.

At block 310, the controller 116 determines whether the controller 116 has received a terminate charge signal from one or more ECUs associated with the accessory loads 106. If the controller 116 has not received the terminate charge signal, the method 300 returns to block 304. If the controller 116 has received the terminate charge signal, the method 300 proceeds to the block 312.

At block 312, the controller 116 transmits signals to transition the inverter switches S1-S6 and the charger switches 152, 154 to cause the RESS 104 to deliver power to the electric motor 112.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle electrical system, comprising:
   a rechargeable energy storage system (RESS) having a first voltage;
   a power inverter selectively connected to the RESS;
   an electric motor having a plurality of machine windings with each of the machine windings including a polyphase terminal electrically connected to the power inverter, and the electric motor further having a neutral terminal separate from the polyphase terminal and adapted to electrically connect to an off-board power source that generates a second voltage that is below the first voltage; and
   a plurality of charger switches, with the plurality of charger switches including a first charger switch that is disposed between the positive terminal of the off-board power source and the RESS to allow current to flow directly from the off-board power source to the RESS;
   wherein the power inverter is configured to cycle between a first operational state where the power inverter electrically disconnects the RESS from the machine windings and a second operational state where the power inverter electrically connects the RESS to the machine windings, such that the power inverter and the electric motor steps up the second voltage of the off-board power source to the first voltage of the RESS;
   wherein the power inverter comprises a set of semiconductor inverter switches that are configured to convert direct current (DC) power to alternating current (AC) power; and
   wherein each of the semiconductor inverter switches comprises a voltage-controlled switching device.

2. The vehicle electrical system of claim 1, wherein the plurality of charger switches further includes a second charger switch, with the second charger switch being disposed between the neutral terminal of the electric motor and the off-board power source, and the second charger switch is configured to transition between a closed state to allow current to flow from the off-board power source to the electric motor and an open state to prevent current from flowing to the electric motor.

3. The vehicle electrical system of claim 1, wherein the plurality of machine windings comprise a plurality of inductors.

4. The vehicle electrical system of claim 3, wherein the voltage-controlled switching device comprises at least one of an insulated gate bipolar transistor (IGBT), a metal-oxide semiconductor field effect transistor (MOSFET), or a wideband-gap (WBG) semiconductor power device.

5. The vehicle electrical system of claim 1, wherein the power inverter comprises a plurality of phase legs, with each of the phase legs comprising a pair of the semiconductor inverter switches, and each of the phase legs is connected to the corresponding polyphase terminal of the plurality of machine windings of the electric motor.

6. The vehicle electrical system of claim 5, wherein the plurality of phase legs includes first, second, and third phase legs, and at least one of the semiconductor inverter switches of the first, second, and third phase legs is pulse-width modulated to allow current to flow through an associated one of the first, second, and third phase legs.

7. The vehicle electrical system of claim 6, further comprising a ripple inductor connected in series between the neutral terminal of the electric motor and the off-board power source, wherein the ripple inductor is configured to mitigate current ripple and torque disturbance.

8. The vehicle electrical system of claim 7, wherein the at least one of the semiconductor inverter switches comprises a contactor.

9. A vehicle electrical system, comprising:
   a rechargeable energy storage system (RESS) having a first voltage;
   a power inverter selectively connected to the RESS;
   an electric motor having a plurality of machine windings with each of the machine windings including a polyphase terminal electrically connected to the power inverter, and the electric motor further having a neutral terminal separate from the polyphase terminals and configured to electrically connect to an off-board power source that generates a second voltage that is below the first voltage;
   a plurality of charger switches, with the plurality of charger switches including a first charger switch that is disposed between the positive terminal of the off-board power source and the RESS to allow current to flow directly from the off-board power source to the RESS; and
   a controller electrically connected to the power inverter, wherein the controller is configured to transmit a plurality of control signals to the power inverter;
   wherein the power inverter is configured to cycle between first and second operational states, the power inverter in the first operational state electrically disconnects the RESS from the machine windings and the power inverter in the second operational state electrically connects the RESS to the machine windings, such that the power inverter and the electric motor steps up the second voltage of the off-board power source to the first voltage of the RESS;
   wherein the power inverter comprises a set of semiconductor inverter switches that are configured to convert direct current (DC) power to alternating current (AC) power; and
   wherein each of the semiconductor inverter switches comprises a voltage-controlled switching device.

10. The vehicle electrical system of claim 9, wherein the plurality of charger switches further includes a second charger switch disposed between the neutral terminal of the electric motor and the off-board power source, and the second charger switch is configured to transition between a closed state to allow current to flow from the off-board power source to the electric motor and an open state to prevent current from flowing to the electric motor.

11. The vehicle electrical system of claim 10, wherein the plurality of machine windings comprise a plurality of inductors.

12. The vehicle electrical system of claim 11, wherein the voltage-controlled switching device comprises at least one of an insulated gate bipolar transistor (IGBT), a metal-oxide semiconductor field effect transistor (MOSFET), a wide-band-gap (WBG) semiconductor power switching device, and an ultra-wideband-gap (UWBG) semiconductor power switching device.

13. The vehicle electrical system of claim 9, wherein the off-board power source comprises an electrical system of a third-party motor vehicle that is separate from the motor vehicle during a V2V charging operation.

14. The vehicle electrical system of claim 13, wherein the controller receives at least one software update via over-the-air programming associated with the control signals generated by the controller.

15. A method of operating a vehicle electrical system having a rechargeable energy storage system (RESS), a power inverter, an electric motor having a plurality of machine windings, each of the machine windings including a polyphase terminal and a neutral terminal, a plurality of charger switches including first and second charger switches, a controller, and an off-board power source connected to the neutral terminal of the electric motor, the method comprising:
- generating, using the controller, a plurality of control signals in response to the controller receiving a charge signal associated with a boost operation;
- cycling a set of semiconductor inverter switches of the power inverter between first and second operational states in response to the power inverter receiving the control signals from the controller, with each of the semiconductor switches comprising a voltage-controlled switching device;
- stepping up a second voltage of the off-board power source to a first voltage for storing in the RESS, in response to the power inverter cycling between first and second operational states; and
- flowing, using the first charger switch disposed between a positive terminal of the off-board power source and the RESS, current directly from the off-board power source to the RESS.

16. The method of claim 15 further comprising:
- generating, using the controller, first and second control signals;
- disposing the power inverter in the first operational state in response to the power inverter receiving the first control signal from the controller;
- electrically disconnecting, using the power inverter, the RESS from the machine windings of the electric motor in response to the power inverter being disposed in the first operational state;
- disposing the power inverter the second operational state in response to the power inverter receiving the second control signal from the controller;
- electrically connecting, using the power inverter, the RESS to the machine windings of the electric motor in response to the power inverter being disposed in the second operational state; and
- stepping up, using the power inverter and the electric motor, the second voltage of the off-board power source to the first voltage of the RESS, in response to the power inverter connecting and disconnecting the RESS to the machine windings.

17. The vehicle electrical system of claim 9, wherein the power inverter comprises a plurality of phase legs, with each of the phase legs comprising a pair of the semiconductor inverter switches, and each of the phase legs is connected to the corresponding polyphase terminal of the plurality of machine windings of the electric motor.

18. The vehicle electrical system of claim 17, wherein the plurality of phase legs includes first, second, and third phase legs, and at least one of the semiconductor inverter switches of the first, second, and third phase legs is pulse-width modulated to allow current to flow through an associated one of the first, second, and third phase legs.

19. The vehicle electrical system of claim 18, further comprising a ripple inductor connected in series between the neutral terminal of the electric motor and the off-board power source, wherein the ripple inductor is configured to mitigate current ripple and torque disturbance.

20. The vehicle electrical system of claim 19, wherein the at least one of the semiconductor inverter switches comprises a contactor.

* * * * *